United States Patent [19]

Kawakita et al.

[11] Patent Number: 5,006,956
[45] Date of Patent: Apr. 9, 1991

[54] DIELECTRIC CERAMIC COMPOSITION

[75] Inventors: Kouji Kawakita, Joyo; Suzushi Kimura; Hideyuki Orinaka, both of Toyonaka; Youichiro Yokotani, Suita; Mariko Ishikawa, Osaka, all of Japan

[73] Assignee: Matsushita Electric Industrial Co., Ltd., Osaka, Japan

[21] Appl. No.: 432,880

[22] Filed: Nov. 7, 1989

[30] Foreign Application Priority Data

Nov. 7, 1988 [JP] Japan .................................. 63-280812
Feb. 8, 1989 [JP] Japan ..................................... 1-29088

[51] Int. Cl.$^5$ ......................... H01G 4/12; C04B 35/46
[52] U.S. Cl. ..................................... 361/321; 501/134; 501/136
[58] Field of Search ................ 501/134, 136; 361/321

[56] References Cited

U.S. PATENT DOCUMENTS 4,711,862 12/1987 Yokotani et al. .................. 501/134

OTHER PUBLICATIONS

Guha et al., *Effect of Excess PbO on the Sintering Characteristics and Dielectric Properties of Pb(Mg$_{1/3}$Nb$_{2/3}$)O$_3$PbTiO$_3$-Based Ceramics*, J. Am. Ceramic Society, Mar. 1988.

*Primary Examiner*—Mark L. Bell
*Assistant Examiner*—Deborah Jones
*Attorney, Agent, or Firm*—Wenderoth, Lind & Ponack

[57] ABSTRACT

A dielectric ceramic composition exhibiting a high dielectric constant, capable of sintering in a short time, at a sintering temperature of 800° to 1000° C., in the atmosphere, a neutral atmosphere or a reducing atmosphere.

The dielectric ceramic composition comprises a main ceramic component represented by the formula PbTi$_x$(Mg$_{1/3}$Nb$_{2/3}$)$_y$ (Ni$_{1/2}$W$_{1/2}$)$_z$O$_3$, wherein $x+y+z=1$, and subsidiary components of PbO is added in an amount of 1.0 to 25.0 mol % and NiO or WO$_3$ in an amount of 1.0 to 15.0 mol %. The subsidiary components are added to the calcined powder of the main component.

Also provided is a dielectric ceramic composition comprising a main ceramic component represented by the formula PbZr$_x$(Ni$_{1/3}$Nb$_{2/3}$)$_y$(Ni$_{1/2}$W$_{1/2}$)$_z$O$_3$, wherein $x+y+z=1$, and subsidiary components of PbO in an amount of 1.0 to 25.0 mol % and NiO in an amount of 1.0 to 15.0 mol %. The subsidiary components are added to the calcined powder of the main component.

The dielectric ceramic compositions are useful in preparing laminate ceramic capacitors and thick film capacitors.

5 Claims, 2 Drawing Sheets

DIELECTRIC CERAMIC COMPOSITION

BACKGROUND OF THE INVENTION

The present invention relates to a dielectric ceramic composition exhibiting a high dielectric constant, capable of sintering in a short time, at a sintering temperature of 800° to 1000° C., in the atmosphere, a neutral atmosphere or a reducing atmosphere.

As materials exhibiting a high dielectric constant suitable for use in ceramic capacitors which are progressively reduced in size and enlarged in capacity, materials mainly composed of barium titanate have been hitherto employed. However, it is necessary to sinter these materials in the atmosphere at a high temperature of about 1300° C. Therefore, when fabricating laminate ceramic capacitors, expensive noble metals such as platinum and palladium are indispensable as the electrode materials, and in particular along with the trend for increasing capacity, the cost of the internal electrode material has pushed up the material cost.

Recently, it has been attempted to lower the cost of laminate ceramic capacitors by, inter alia, the following two methods. One method involves making barium titanate material resistive to reduction, and sintering it in an atmosphere of a low oxygen partial pressure, thus making it possible to use an inexpensive base metal as the electrode material. The other method involves sintering at a low temperature of about 1000° C. a silver-palladium alloy electrode material and a lead dielectric material and inexpensive silver.

On the other hand, in electronic appliances where reduction in size and enhancement of reliability are demanded, the hybrid IC of a high packaging density is promoted, and the demand for a thick film capacitor is mounting to replace the conventional chip capacitor. To fabricate this thick film capacitor, a dielectric material capable of sintering at a low temperature and in a short time is required, and the lead dielectric is used mainly as this material. Therefore, as the material applicable to both increasing the capacity of a laminate chip capacitor and providing a thick film capacitor, the lead dielectric is being developed intensively.

A $PbTiO_3$ - $Pb(Mg_{\frac{1}{3}}Nb_{\frac{2}{3}})O_3$ - $Pb(Ni_{\frac{1}{2}}W_{\frac{1}{2}})O_3$ solid solution and a $PbZrO_3$ - $Pb(Ni_{\frac{1}{2}}Nb_{\frac{2}{3}})O_3$ - $Pb(Ni_{\frac{1}{2}}W_{\frac{1}{2}})O_3$ solid solution are compositions exhibiting a high dielectric constant which can be sintered in the atmosphere at 1100° C. or a lower temperature, as disclosed in Japanese Patent Laid-Open Nos. 61-155249 and No. 61-155248, but it is necessary to maintain the sintering temperature for several hours in order to heighten the dielectric constant and to obtain sintered material having a sufficient density. On the other hand, when fabricating a thick film capacitor for a hybrid IC, a low temperature and a short sintering time is indispensable, and these dielectric materials are not sintered completely under such conditions, and therefore the desired characteristics are not obtained. Still worse, due to the effects of heat in a neutral or reducing atmosphere over a long period of time, oxygen defects are likely to occur in the dielectric ceramics, which lead to practical problems such as lowering of the dielectric constant and reduction of insulation resistance.

SUMMARY OF THE INVENTION

In light of the above-discussed problems, it is a primary object of the present invention to provide a dielectric ceramic composition exhibiting a high dielectric constant, and a ceramic capacitor or thick film capacitor using the same, capable of sintering at 800° to 1000° C. in a short time in the atmosphere, a neutral atmosphere or a reducing atmosphere, without detrimentally affecting the high dielectric constant of a $PbTiO_3$ - $Pb(Mg_{\frac{1}{3}}Nb_{\frac{2}{3}})O_3$ - $Pb(Ni_{\frac{1}{2}}W_{\frac{1}{2}})O_3$ solid solution and a $PbZrO_3$ - $Pb(Ni_{\frac{1}{2}}Nb_{\frac{2}{3}})O_3$ - $Pb(Ni_{\frac{1}{2}}W_{\frac{1}{2}})O_3$ solid solution.

To achieve the above object, the present invention provides a dielectric ceramic composition comprising main ceramic components represented by the formula $PbTi_x(Mg_{\frac{1}{3}}Nb_{\frac{2}{3}})_y(Ni_{\frac{1}{2}}W_{\frac{1}{2}})_zO_3$, wherein $x+y+z=1$, and subsidiary components of PbO is added in an amount of 1.0 to 25.0 mol % and NiO or $WO_3$ in an amount of 1.0 to 15.0 mol %. The subsidiary components are added to the calcined powder of the main components represented by the formula $PbTi_x(Mg_{\frac{1}{3}}Nb_{\frac{2}{3}})_y(Ni_{\frac{1}{2}}W_{\frac{1}{2}})_zO_3$. In FIG. 1, the polygon ABCDE shows a range of composition of the ceramic composition of the present invention, and the compositions A, B, C, D, E at the vertices of the polygon are expressed by the following numerical values:

A is $x = 2.5, y = 95.0, z = 2.5$;
B is $x = 12.5, y = 85.0, z = 2.5$;
C is $x = 60.0, y = 10.0, z = 30.0$;
D is $x = 40.0, y = 10.0, z = 50.0$;
E is $x = 2.5, y = 90.0, z = 7.5$. (all units are mol %).

Also, the present invention provides a dielectric ceramic composition comprising main ceramic components represented by the formula $PbZr_x(Ni_{\frac{1}{2}}Nb_{\frac{2}{3}})_y(Ni_{\frac{1}{2}}W_{\frac{1}{2}})_zO_3$, wherein $x+y+z=1$, and subsidiary components of PbO in an amount of 1.0 to 25.0 mol % and NiO in an amount of 1.0 to 15.0 mol %. The subsidiary components are added to the calcined powder of the main components represented by the formula $PbZr_x(Nb_{\frac{2}{3}})_y(Ni_{\frac{1}{2}}W_{\frac{1}{2}})_zO_3$. In FIG. 2, the polygon ABCD shows a range of composition of the ceramic composition of the present invention, and the compositions A, B, C, and D at the vertices of the polygon are expressed by the following numerical values:

A is $x = 35.0, y = 60.0, z = 5.0$;
B is $x = 55.0, y = 40.0, z = 5.0$;
C is $x = 65.0, y = 20.0, z = 15.0$;
D is $x = 52.5, y = 20, z = 27.5$. (all units are mol %)

In other words, in the dielectric ceramic composition of the invention, by adding PbO and NiO or $WO_3$ to the calcined powder of $PbTiO_3$ - $Pb(Mg_{\frac{1}{3}} Nb_{\frac{2}{3}})O_3$ - $Pb(Ni_{\frac{1}{2}} W_{\frac{1}{2}})O_3$ system and $PbZrO_3$ - $Pb(Ni_{\frac{1}{2}} Nb_{\frac{2}{3}})O_3$ - $Pb(Ni_{\frac{1}{2}} W_{\frac{1}{2}})O_3$ system having the perovskite structure, a liquid phase is generated at low temperature by making use of the eutectic composition of PbO and NiO, or PbO and $WO_3$, and when these additives are simultaneously solubilized at site A and site B, diffusion into the dielectric is smooth, and formation of a grain boundary layer due to additives is suppressed. Therefore, by preventing a lowering of the dielectric constant, it is possible to obtain a laminate ceramic capacitor or a thick film capacitor of a large capacity capable of being sintered to a sufficient density in a short time at a low baking temperature of not more than 1000° C.

The invention will be better understood, along with other objects and features thereof, from the following detailed description in conjunction with the drawings.

DETAILED DESCRIPTION OF THE INVENTION

Figure 1:
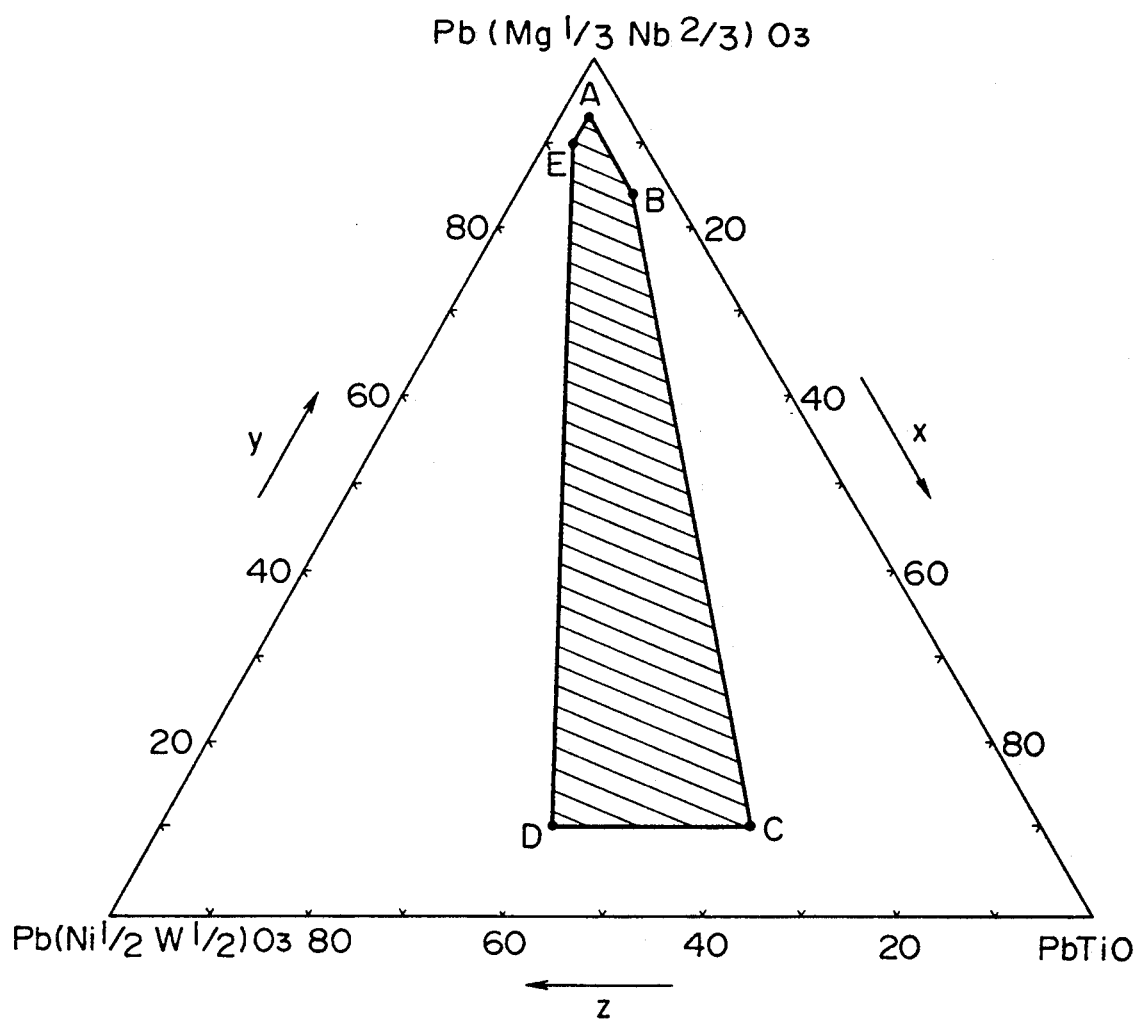
FIG. 1 is a ternary system composition diagram mainly composed of $PbTiO_3$, $Pb(Mg_{\frac{1}{3}} Nb_{\frac{2}{3}})O_3$ and $Pb(Ni_{\frac{1}{2}} W_{\frac{1}{2}})O_3$ showing the composition range of one of the embodiments of the invention.

Some of the preferred embodiments of the invention are described in detail below.

Example 1

As the starting materials, PbO, MgO, $Nb_2O_5$, $TiO_2$, NiO, and $WO_3$ of chemically high purity were used. After correcting their purity, specified amounts were weighed, and purified water was added, and then mixed in a ball mill for 17 hours using agate balls. After separating the majority of water content by suction filtration, the residue was dried, sufficiently crushed by an automatic agate mortar, and 5 wt. % of the powder of purified water was added, and the powder was formed into a columnar shape of 60 mm in diameter and about 50 mm in height at a forming pressure of 500 kg/cm². It was then put in an aluminum crucible, covered with a lid of the same material, and calcined at 750° to 1000° C. for 2 hours. This calcined material was coarsely crushed by an alumina mortar, then further crushed by a ball mill for 17 hours, and dried after suction filtration. This process of calcination, crushing and drying was repeated several times. The resultant powder was analyzed by X-ray analysis, and the perovskite phase was recognized.

To this dielectric powder, PbO and NiO or $WO_3$ were added as subsidiary components, and mixed by the automatic agate mortar, then a 6 wt. % aqueous solution of polyvinyl alcohol was added in an amount of 6 wt. % of the powder, subsequently granulated through a 32-mesh sieve, and formed into a disk of 13 mm in diameter and about 5 mm in height at a forming pressure of 1000 kg/cm². Next this formed disk was kept in a 600° C. atmosphere for 1 hour to get rid of the binder, then put into a magnesia ceramic container and covered with a lid of the same material, and heated to a specified temperature at a rate of 2400° C./hr in the atmosphere, a neutral atmosphere or a reducing atmosphere, and after holding at the maximum temperature for 5 to 30 minutes, it was cooled at a rate of 2400° C./hr.

The thus obtained sintered piece was processed into a disk of 1 mm in thickness, and Cr-Au was evaporated on both sides to form the electrodes, and the dielectric constant and tan δ were measured in an electric field of 1 kHz, 1 V/mm. Table 1 shows the material composition of the invention and the dielectric characteristics of the specimens sintered in the atmosphere. The results were of 900° C. sintered in the sintering atmosphere of a neutral atmosphere of nitrogen, and in a nitrogen-hydrogen mixed gas with an oxygen partial pressure of $10^{-8}$ atm or more are shown in Tables 2 and 3, respectively.

TABLE 1

| No. | Principal dielectric composition | | | Subsidiary component | | | Baking temperature (°C.) | Dielectric constant (20° C.) | tan δ (20° C.) [%] |
|---|---|---|---|---|---|---|---|---|---|
| | $PbTiO_3$ (mol %) | $Pb(Mg_{\frac{1}{3}} Nb_{\frac{2}{3}})O_3$ (mol %) | $Pb(Ni_{\frac{1}{2}} W_{\frac{1}{2}})O_3$ (mol %) | PbO (mol %) | NiO (mol %) | $WO_3$ (mol %) | | | |
| 1* | 20.0 | 70.0 | 10.0 | 0 | 0 | 0 | 900 | 1920 | 4.5 |
| 2* | 20.0 | 70.0 | 10.0 | 0.5 | 0.5 | 0 | 900 | 3280 | 3.3 |
| 3 | 20.0 | 70.0 | 10.0 | 1.0 | 1.0 | 0 | 900 | 8950 | 3.9 |
| 4 | 20.0 | 70.0 | 10.0 | 10.0 | 5.0 | 0 | 900 | 13500 | 4.8 |
| 5 | 20.0 | 70.0 | 10.0 | 25.0 | 15.0 | 0 | 900 | 9680 | 3.9 |
| 6* | 20.0 | 70.0 | 10.0 | 30.0 | 25.0 | 0 | 900 | 4810 | 3.5 |
| 7 | 2.5 | 95.0 | 2.5 | 10.0 | 5.0 | 0 | 900 | 8520 | 4.3 |
| 8 | 12.5 | 85.0 | 2.5 | 10.0 | 5.0 | 0 | 900 | 10500 | 3.8 |
| 9 | 60.0 | 10.0 | 30.0 | 10.0 | 5.0 | 0 | 900 | 6360 | 4.1 |
| 10 | 40.0 | 10.0 | 50.0 | 10.0 | 5.0 | 0 | 900 | 6880 | 1.5 |
| 11 | 2.5 | 90.0 | 7.5 | 10.0 | 5.0 | 0 | 900 | 7130 | 1.2 |
| 12* | 20.0 | 70.0 | 10.0 | 0.5 | 0 | 0.5 | 900 | 3300 | 5.0 |
| 13 | 20.0 | 70.0 | 10.0 | 1.0 | 0 | 1.0 | 900 | 8720 | 4.0 |
| 14 | 20.0 | 70.0 | 10.0 | 10.0 | 0 | 5.0 | 900 | 8550 | 3.5 |
| 15 | 20.0 | 70.0 | 10.0 | 25.0 | 0 | 15.0 | 900 | 7640 | 3.0 |
| 16* | 20.0 | 70.0 | 10.0 | 30.0 | 0 | 25.0 | 900 | 4360 | 3.9 |
| 17 | 2.5 | 95.0 | 2.5 | 10.0 | 0 | 5.0 | 900 | 7670 | 2.6 |
| 18 | 12.5 | 85.0 | 2.5 | 10.0 | 0 | 5.0 | 900 | 10260 | 2.9 |
| 19 | 60.0 | 10.0 | 30.0 | 10.0 | 0 | 5.0 | 900 | 6810 | 2.6 |
| 20 | 40.0 | 10.0 | 50.0 | 10.0 | 0 | 5.0 | 900 | 7280 | 1.8 |
| 21 | 2.5 | 90.0 | 7.5 | 10.0 | 0 | 5.0 | 900 | 6950 | 2.0 |
| 22* | 20.0 | 70.0 | 10.0 | 10.0 | 5.0 | 0 | 750 | 3650 | 8.5 |
| 23 | 20.0 | 70.0 | 10.0 | 10.0 | 5.0 | 0 | 800 | 6280 | 7.6 |
| 24 | 20.0 | 70.0 | 10.0 | 10.0 | 5.0 | 0 | 850 | 7300 | 5.3 |
| 25 | 20.0 | 70.0 | 10.0 | 10.0 | 5.0 | 0 | 950 | 12030 | 4.3 |
| 26 | 20.0 | 70.0 | 10.0 | 10.0 | 5.0 | 0 | 1000 | 7600 | 6.0 |
| 27* | 20.0 | 70.0 | 10.0 | 10.0 | 5.0 | 0 | 1050 | 4530 | 7.8 |
| 28* | 20.0 | 70.0 | 10.0 | 10.0 | 0 | 5.0 | 750 | 2860 | 9.3 |
| 29 | 20.0 | 70.0 | 10.0 | 10.0 | 0 | 5.0 | 800 | 5620 | 8.6 |
| 30 | 20.0 | 70.0 | 10.0 | 10.0 | 0 | 5.0 | 850 | 6030 | 5.5 |
| 31 | 20.0 | 70.0 | 10.0 | 10.0 | 0 | 5.0 | 950 | 9780 | 4.8 |
| 32 | 20.0 | 70.0 | 10.0 | 10.0 | 0 | 5.0 | 1000 | 6830 | 3.9 |
| 33* | 20.0 | 70.0 | 10.0 | 10.0 | 0 | 5.0 | 1050 | 4320 | 5.9 |

*The asterisked specimens are reference examples.

TABLE 2

| No. | Principal dielectric composition | | | Subsidiary component | | | Dielectric constant (20° C.) | tan δ (20° C.) [%] |
|---|---|---|---|---|---|---|---|---|
| | PbTiO₃ (mol %) | Pb(Mg⅓Nb⅔)O₃ (mol %) | Pb(Ni½W½)O₃ (mol %) | PbO (mol %) | NiO (mol %) | WO₃ (mol %) | | |
| 1* | 20.0 | 70.0 | 10.0 | 0 | 0 | 0 | 1720 | 6.5 |
| 2* | 20.0 | 70.0 | 10.0 | 0.5 | 0.5 | 0 | 3070 | 5.3 |
| 3 | 20.0 | 70.0 | 10.0 | 1.0 | 1.0 | 0 | 9020 | 6.2 |
| 4 | 20.0 | 70.0 | 10.0 | 10.0 | 5.0 | 0 | 12250 | 6.9 |
| 5 | 20.0 | 70.0 | 10.0 | 25.0 | 15.0 | 0 | 8860 | 5.0 |
| 6* | 20.0 | 70.0 | 10.0 | 30.0 | 25.0 | 0 | 3520 | 5.3 |
| 7 | 2.5 | 95.0 | 2.5 | 10.0 | 5.0 | 0 | 8790 | 6.8 |
| 8 | 12.5 | 85.0 | 2.5 | 10.0 | 5.0 | 0 | 11220 | 6.0 |
| 9 | 60.0 | 10.0 | 30.0 | 10.0 | 5.0 | 0 | 6000 | 5.2 |
| 10 | 40.0 | 10.0 | 50.0 | 10.0 | 5.0 | 0 | 6380 | 3.5 |
| 11 | 2.5 | 90.0 | 7.5 | 10.0 | 5.0 | 0 | 6820 | 2.3 |
| 12* | 20.0 | 70.0 | 10.0 | 0.5 | 0 | 0.5 | 2650 | 5.0 |
| 13 | 20.0 | 70.0 | 10.0 | 1.0 | 0 | 1.0 | 9010 | 4.5 |
| 14 | 20.0 | 70.0 | 10.0 | 10.0 | 0 | 5.0 | 10660 | 6.2 |
| 15 | 20.0 | 70.0 | 10.0 | 25.0 | 0 | 15.0 | 7650 | 6.3 |
| 16* | 20.0 | 70.0 | 10.0 | 30.0 | 0 | 25.0 | 3960 | 8.2 |
| 17 | 2.5 | 95.0 | 2.5 | 10.0 | 0 | 5.0 | 7570 | 3.6 |
| 18 | 12.5 | 85.0 | 2.5 | 10.0 | 0 | 5.0 | 10580 | 3.8 |
| 19 | 60.0 | 10.0 | 30.0 | 10.0 | 0 | 5.0 | 6660 | 3.9 |
| 20 | 40.0 | 10.0 | 50.0 | 10.0 | 0 | 5.0 | 7080 | 1.8 |
| 21 | 2.5 | 90.0 | 7.5 | 10.0 | 0 | 5.0 | 7060 | 2.0 |

*The asterisked specimens are reference examples.

TABLE 3

| No. | Principal dielectric composition | | | Subsidiary component | | | Dielectric constant (20° C.) | tan δ (20° C.) [%] |
|---|---|---|---|---|---|---|---|---|
| | PbTiO₃ (mol %) | Pb(Mg⅓Nb⅔)O₃ (mol %) | Pb(Ni½W½)O₃ (mol %) | PbO (mol %) | NiO (mol %) | WO₃ (mol %) | | |
| 1* | 20.0 | 70.0 | 10.0 | 0 | 0 | 0 | 1520 | 8.0 |
| 2* | 20.0 | 70.0 | 10.0 | 0.5 | 0.5 | 0 | 3060 | 7.8 |
| 3 | 20.0 | 70.0 | 10.0 | 1.0 | 1.0 | 0 | 7950 | 5.9 |
| 4 | 20.0 | 70.0 | 10.0 | 10.0 | 5.0 | 0 | 9860 | 5.1 |
| 5 | 20.0 | 70.0 | 10.0 | 25.0 | 15.0 | 0 | 8680 | 5.3 |
| 6* | 20.0 | 70.0 | 10.0 | 30.0 | 25.0 | 0 | 3950 | 5.9 |
| 7 | 2.5 | 95.0 | 2.5 | 10.0 | 5.0 | 0 | 7960 | 6.0 |
| 8 | 12.5 | 85.0 | 2.5 | 10.0 | 5.0 | 0 | 9890 | 6.3 |
| 9 | 60.0 | 10.0 | 30.0 | 10.0 | 5.0 | 0 | 6420 | 8.6 |
| 10 | 40.0 | 10.0 | 50.0 | 10.0 | 5.0 | 0 | 6350 | 3.5 |
| 11 | 2.5 | 90.0 | 7.5 | 10.0 | 5.0 | 0 | 7090 | 2.9 |
| 12* | 20.0 | 70.0 | 10.0 | 0.5 | 0 | 0.5 | 3070 | 5.2 |
| 13 | 20.0 | 70.0 | 10.0 | 1.0 | 0 | 1.0 | 8360 | 4.8 |
| 14 | 20.0 | 70.0 | 10.0 | 10.0 | 0 | 5.0 | 8500 | 4.3 |
| 15 | 20.0 | 70.0 | 10.0 | 25.0 | 0 | 15.0 | 7840 | 4.9 |
| 16* | 20.0 | 70.0 | 10.0 | 30.0 | 0 | 25.0 | 3960 | 5.6 |
| 17 | 2.5 | 95.0 | 2.5 | 10.0 | 0 | 5.0 | 6670 | 4.3 |
| 18 | 12.5 | 85.0 | 2.5 | 10.0 | 0 | 5.0 | 10020 | 4.6 |
| 19 | 60.0 | 10.0 | 30.0 | 10.0 | 0 | 5.0 | 6320 | 2.6 |
| 20 | 40.0 | 10.0 | 50.0 | 10.0 | 0 | 5.0 | 6940 | 2.3 |
| 21 | 2.5 | 90.0 | 7.5 | 10.0 | 0 | 5.0 | 6720 | 1.9 |

*The asterisked specimens are reference examples.

As shown in Tables 1 to 3, in the material composition of the invention, in spite of a short sintering time at 900° C., and in various atmospheres, densely sintered bodies of a high dielectric constant were obtained.

In FIG. 1 the composition range of the principal components of the invention are shown in the ternary system composition diagram mainly composed of $PbTiO_3$, $Pb(Mg_{\frac{1}{3}}Nb_{\frac{2}{3}})O_3$ and $Pb(Ni_{\frac{1}{2}}W_{\frac{1}{2}})O_3$.

Here, the reason of specifically defining the claimed ceramic composition as:

a dielectric ceramic composition comprising main ceramic components represented by the formula $PbTi_x(Mg_{\frac{1}{3}}Nb_{\frac{2}{3}})_y(Ni_{\frac{1}{2}}W_{\frac{1}{2}})_zO_3$, wherein $x+y+z=1$, and subsidiary components of PbO is added in an amount of 1.0 to 25.0 mol % and NiO or $WO_3$ in an amount of 1.0 to 15.0 mol %. The subsidiary components are added to the calcined powder of the main components represented by the formula $PbTi_x(Mg_{\frac{1}{3}}Nb_{\frac{2}{3}})_y(Ni_{1/78}W_{\frac{1}{2}})_zO_3$. In FIG. 1, the polygon ABCDE shows a range of composition of the ceramic composition of the present invention, and the compositions A, B, C, D, E at the vertices of the polygon are expressed by the following numerical values:

A is $x = 2.5, y = 95.0, z = 2.5$;
B is $x = 12.5, y = 85.0, z = 2.5$;
C is $x = 60.0, y = 10.0, z = 30.0$;
D is $x = 40.0, y = 10.0, z = 50.0$;
E is $x = 2.5, y = 90.0, z = 7.5$. (all units are mol %).

is that the sintering is insufficient in a composition outside the specified range, as indicated by the reference examples shown in Tables 1 to 3, since the dielectric constant of the sintered materials at a sintering temperature of 900° C. is less than 5000. Furthermore, at a sintering temperature of 800° C. or less, the sintering is insufficient, and at 1000° C. or higher, the dielectric constant is lowered, and desired characteristics may not be obtained.

Example 2

Similar to Example 1, to the calcined, crushed and dried dielectric power, PbO and NiO or $WO_3$ were added as subsidiary components, mixed in a wet process by a ball mill, the mixture was dried, a vehicle having a resin mainly made of ethyl cellulose dissolved in solvent was added, the compound was kneaded in three-stage rolls, and a dielectric paste was prepared. On the other hand, in order to form a thick film capacity of $2 \times 2$ $mm^2$ on an alumina substrate of 96% purity, a copper electrode was printed and dried as the lower electrode, the obtained dielectric paste was printed and dried in a thickness of 50 to 60 μm as the dielectric layer in two steps, a copper electrode similar to the lower electrode was printed and dried as the upper electrode, thereby forming a three-layer printed thick film consisting of an electrode, dielectric and electrode, and it was sintered in a nitrogen atmosphere at a maximum temperature of 800° to 1000° C., for 5 to 30 minutes, in a belt furnace. The dielectric constant and tan δ of the thus obtained thick film capacitor were measured in an electric field of 1 kHz, 1 V/mm. The material composition of the invention and the dielectric characteristics of the specimens sintered at 900° C. in nitrogen are shown in Table 4.

range of the present invention as indicated by the reference examples in Table 4.

In this embodiment, it is shown that sintering is possible in nitrogen, but it may be easily inferred that sintering is also possible in a neutral atmosphere of argon, helium or the like.

Meanwhile, as the electrodes used in the invention, any electrodes that can be sintered at 800 to 1000° C. in the atmosphere, a neutral atmosphere or a reducing atmosphere may be properly selected and used.

Example 3

As the starting materials, PbO, $ZrO_2$, $Nb_2O_5$, NiO and $WO_3$ of chemically high purity were used. They were processed in the same manner as in Example 1, and a dielectric powder was prepared.

To this dielectric powder, PbO and NiO or $WO_3$ were added as subsidiary components, mixed by an automatic agate mortar, a 6 wt. % aqueous solution of polyvinyl alcohol was added in an amount of 6 wt. % of the powder, the mixture was granulated through a 32-mesh sieve, and formed into a disk of 13 mm in a diameter and about 5 mm in height at a forming pressure of 1000 $kg/cm^2$. This formed disk was held in a 600° C. atmosphere for 1 hour to get rid of the binder, then put in a magnesia ceramic container and covered with a lid of the same material, and heated to a specified temperature in the atmosphere, a neutral atmosphere or a reducing atmosphere at a rate of 2400° C./hr, and after holding at the maximum temperature for 5 to 30 minutes, it was cooled at a rate of 2400° C./hr.

TABLE 4

| | Principal dielectric composition | | | Subsidiary component | | | Dielectric | tan δ |
|---|---|---|---|---|---|---|---|---|
| No. | $PbTiO_3$ (mol %) | $Pb(Mg_{\frac{1}{3}}Nb_{\frac{2}{3}})O_3$ (mol %) | $Pb(Ni_{\frac{1}{2}}W_{\frac{1}{2}})O_3$ (mol %) | PbO (mol %) | NiO (mol %) | $WO_3$ (mol %) | constant (20° C.) | (20° C.) [%] |
| 1* | 20.0 | 70.0 | 10.0 | 0 | 0 | 0 | 1530 | 8.9 |
| 2* | 20.0 | 70.0 | 10.0 | 0.5 | 0.5 | 0 | 2980 | 6.8 |
| 3 | 20.0 | 70.0 | 10.0 | 1.0 | 1.0 | 0 | 7620 | 5.8 |
| 4 | 20.0 | 70.0 | 10.0 | 10.0 | 5.0 | 0 | 8320 | 4.8 |
| 5 | 20.0 | 70.0 | 10.0 | 25.0 | 15.0 | 0 | 6250 | 4.2 |
| 6* | 20.0 | 70.0 | 10.0 | 30.0 | 25.0 | 0 | 3500 | 6.2 |
| 7 | 2.5 | 95.0 | 2.5 | 10.0 | 5.0 | 0 | 6360 | 5.3 |
| 8 | 12.5 | 85.0 | 2.5 | 10.0 | 5.0 | 0 | 6950 | 4.9 |
| 9 | 60.0 | 10.0 | 30.0 | 10.0 | 5.0 | 0 | 5260 | 4.9 |
| 10 | 40.0 | 10.0 | 50.0 | 10.0 | 5.0 | 0 | 5100 | 3.9 |
| 11 | 2.5 | 90.0 | 7.5 | 10.0 | 5.0 | 0 | 5120 | 2.9 |
| 12* | 20.0 | 70.0 | 10.0 | 0.5 | 0 | 0.5 | 2970 | 5.6 |
| 13 | 20.0 | 70.0 | 10.0 | 1.0 | 0 | 1.0 | 6980 | 5.8 |
| 14 | 20.0 | 70.0 | 10.0 | 10.0 | 0 | 5.0 | 7930 | 4.9 |
| 15 | 20.0 | 70.0 | 10.0 | 25.0 | 0 | 15.0 | 6240 | 3.7 |
| 16* | 20.0 | 70.0 | 10.0 | 30.0 | 0 | 25.0 | 2360 | 7.9 |
| 17 | 2.5 | 95.0 | 2.5 | 10.0 | 0 | 5.0 | 6670 | 3.8 |
| 18 | 12.5 | 85.0 | 2.5 | 10.0 | 0 | 5.0 | 7680 | 3.3 |
| 19 | 60.0 | 10.0 | 30.0 | 10.0 | 0 | 5.0 | 5390 | 2.8 |
| 20 | 40.0 | 10.0 | 50.0 | 10.0 | 0 | 5.0 | 6020 | 2.6 |
| 21 | 2.5 | 90.0 | 7.5 | 10.0 | 0 | 5.0 | 5020 | 9.0 |

*The asterisked specimens are reference examples.

As shown in Table 4, by using the sintered materials of the material composition of the invention, thick film capacitors exhibiting a high dielectric constant having a high density were obtained in spite of a short time and low-temperature sintering.

As demonstrated in Example 1, the dielectric constant of the sinters are less than 5000 at a sintering temperature of 800° to 1000° C., and the sintering is insufficient, in compositions other than those in the defined The thus obtained sintered piece was processed into a disk of 1 mm in thickness, C-Au was evaporated on both sides as the electrodes, and the dielectric constant and tan δ were measured in an electric field of 1 kHz, 1 V/mm. Table 5 shows the material composition of the invention and the dielectric characteristics of the specimens sintered in the atmosphere. The results of 900° C. sintering in the sintering atmosphere of a neutral atmosphere of nitrogen, and in a nitrogen-hydrogen mixed gas with the oxygen particle pressure of $10^{-8}$ atm or more are shown in Tables 6 and 7, respectively.

TABLE 5

| No. | Principal dielectric composition PbZrO₃ (mol %) | Pb(Ni₁/₃Nb₂/₃)O₃ (mol %) | Pb(Ni₁/₂W₁/₂)O₃ (mol %) | Subsidiary component PbO (mol %) | NiO (mol %) | WO₃ (mol %) | Baking temperature (°C.) | Dielectric constant (20° C.) | tan δ (20° C.) [%] |
|---|---|---|---|---|---|---|---|---|---|
| 1* | 55.0 | 30.0 | 15.0 | 0 | 0 | 0 | 900 | 1280 | 8.9 |
| 2* | 55.0 | 30.0 | 15.0 | 0.5 | 0.5 | 0 | 900 | 2400 | 7.2 |
| 3 | 55.0 | 30.0 | 15.0 | 1.0 | 1.0 | 0 | 900 | 4750 | 6.3 |
| 4 | 55.0 | 30.0 | 15.0 | 10.0 | 5.0 | 0 | 900 | 8200 | 6.6 |
| 5 | 55.0 | 30.0 | 15.0 | 25.0 | 15.0 | 0 | 900 | 5020 | 5.9 |
| 6* | 55.0 | 30.0 | 15.0 | 30.0 | 25.0 | 0 | 900 | 2900 | 5.7 |
| 7 | 35.0 | 60.0 | 5.0 | 10.0 | 5.0 | 0 | 900 | 8420 | 3.2 |
| 8 | 55.0 | 40.0 | 5.0 | 10.0 | 5.0 | 0 | 900 | 6130 | 5.8 |
| 9 | 65.0 | 20.0 | 15.0 | 10.0 | 5.0 | 0 | 900 | 6030 | 5.0 |
| 10 | 52.0 | 20.0 | 27.0 | 10.0 | 5.0 | 0 | 900 | 5840 | 2.2 |
| 11* | 55.0 | 30.0 | 15.0 | 0.5 | 0 | 0.5 | 900 | 1780 | 6.3 |
| 12 | 55.0 | 30.0 | 15.0 | 1.0 | 0 | 1.0 | 900 | 4020 | 5.8 |
| 13 | 55.0 | 30.0 | 15.0 | 10.0 | 0 | 5.0 | 900 | 7280 | 5.5 |
| 14 | 55.0 | 30.0 | 15.0 | 25.0 | 0 | 15.0 | 900 | 4050 | 4.8 |
| 15* | 55.0 | 30.0 | 15.0 | 30.0 | 0 | 25.0 | 900 | 2530 | 5.0 |
| 16 | 35.0 | 60.0 | 5.0 | 10.0 | 0 | 5.0 | 900 | 7540 | 2.7 |
| 17 | 55.0 | 40.0 | 5.0 | 10.0 | 0 | 5.0 | 900 | 5900 | 4.8 |
| 18 | 65.0 | 20.0 | 15.0 | 10.0 | 0 | 5.0 | 900 | 5750 | 5.0 |
| 19 | 52.5 | 20.0 | 27.5 | 10.0 | 0 | 5.0 | 900 | 5020 | 1.8 |
| 20* | 55.0 | 30.0 | 15.0 | 10.0 | 5.0 | 0 | 750 | 2900 | 12.3 |
| 21 | 55.0 | 30.0 | 15.0 | 10.0 | 5.0 | 0 | 800 | 4430 | 8.2 |
| 22 | 55.0 | 30.0 | 15.0 | 10.0 | 5.0 | 0 | 850 | 7090 | 7.2 |
| 23 | 55.0 | 30.0 | 15.0 | 10.0 | 5.0 | 0 | 950 | 8070 | 6.5 |
| 24 | 55.0 | 30.0 | 15.0 | 10.0 | 5.0 | 0 | 1000 | 5710 | 6.8 |
| 25* | 55.0 | 30.0 | 15.0 | 10.0 | 5.0 | 0 | 1050 | 2240 | 8.8 |
| 26* | 55.0 | 30.0 | 15.0 | 10.0 | 0 | 5.0 | 750 | 1940 | 14.8 |
| 27 | 55.0 | 30.0 | 15.0 | 10.0 | 0 | 5.0 | 800 | 4860 | 8.8 |
| 28 | 55.0 | 30.0 | 15.0 | 10.0 | 0 | 5.0 | 850 | 6400 | 5.9 |
| 29 | 55.0 | 30.0 | 15.0 | 10.0 | 0 | 5.0 | 950 | 7240 | 5.2 |
| 30 | 55.0 | 30.0 | 15.0 | 10.0 | 0 | 5.0 | 1000 | 5200 | 6.3 |
| 31* | 55.0 | 30.0 | 15.0 | 10.0 | 0 | 5.0 | 1050 | 1080 | 8.8 |

*The asterisked specimens are reference examples.

TABLE 6

| No. | Principal dielectric composition PbZrO₃ (mol %) | Pb(Ni₁/₃Nb₂/₃)O₃ (mol %) | Pb(Ni₁/₂W₁/₂)O₃ (mol %) | Subsidiary component PbO (mol %) | NiO (mol %) | WO₃ (mol %) | Dielectric constant (20° C.) | tan δ (20° C.) [%] |
|---|---|---|---|---|---|---|---|---|
| 1* | 55.0 | 30.0 | 15.0 | 0 | 0 | 0 | 1380 | 8.5 |
| 2* | 55.0 | 30.0 | 15.0 | 0.5 | 0.5 | 0 | 2320 | 8.2 |
| 3 | 55.0 | 30.0 | 15.0 | 1.0 | 1.0 | 0 | 4540 | 7.2 |
| 4 | 55.0 | 30.0 | 15.0 | 10.0 | 5.0 | 0 | 7960 | 6.8 |
| 5 | 55.0 | 30.0 | 15.0 | 25.0 | 15.0 | 0 | 5080 | 5.8 |
| 6* | 55.0 | 30.0 | 15.0 | 30.0 | 25.0 | 0 | 3890 | 5.9 |
| 7 | 35.0 | 60.0 | 5.0 | 10.0 | 5.0 | 0 | 8000 | 3.5 |
| 8 | 55.0 | 40.0 | 5.0 | 10.0 | 5.0 | 0 | 6300 | 5.5 |
| 9 | 65.0 | 20.0 | 15.0 | 10.0 | 5.0 | 0 | 5580 | 4.9 |
| 10 | 52.5 | 20.0 | 27.5 | 10.0 | 5.0 | 0 | 5800 | 1.9 |
| 11* | 55.0 | 30.0 | 15.0 | 0.5 | 0 | 0.5 | 1520 | 7.2 |
| 12 | 55.0 | 30.0 | 15.0 | 1.0 | 0 | 1.0 | 4350 | 6.6 |
| 13 | 55.0 | 30.0 | 15.0 | 10.0 | 0 | 5.0 | 7030 | 5.8 |
| 14 | 55.0 | 30.0 | 15.0 | 25.0 | 0 | 15.0 | 4850 | 5.0 |
| 15* | 55.0 | 30.0 | 15.0 | 30.0 | 0 | 25.0 | 3100 | 5.0 |
| 16 | 35.0 | 60.0 | 5.0 | 10.0 | 0 | 5.0 | 6920 | 3.0 |
| 17 | 55.0 | 40.0 | 5.0 | 10.0 | 0 | 5.0 | 6070 | 4.8 |
| 18 | 65.0 | 20.0 | 15.0 | 10.0 | 0 | 5.0 | 5550 | 5.2 |
| 19 | 52.5 | 20.0 | 27.5 | 10.0 | 0 | 5.0 | 4910 | 2.0 |

*The asterisked specimens are reference examples.

TABLE 7

| No. | Principal dielectric composition PbZrO₃ (mol %) | Pb(Ni₁/₃Nb₂/₃)O₃ (mol %) | Pb(Ni₁/₂W₁/₂)O₃ (mol %) | Subsidiary component PbO (mol %) | NiO (mol %) | WO₃ (mol %) | Dielectric constant (20° C.) | tan δ (20° C.) [%] |
|---|---|---|---|---|---|---|---|---|
| 1 | 55.0 | 30.0 | 15.0 | 0 | 0 | 0 | 1080 | 9.2 |
| 2 | 55.0 | 30.0 | 15.0 | 0.5 | 0.5 | 0 | 2520 | 10.3 |
| 3 | 55.0 | 30.0 | 15.0 | 1.0 | 1.0 | 0 | 4320 | 8.2 |
| 4 | 55.0 | 30.0 | 15.0 | 10.0 | 5.0 | 0 | 7530 | 8.3 |
| 5 | 55.0 | 30.0 | 15.0 | 25.0 | 15.0 | 0 | 5130 | 6.2 |

TABLE 7-continued

| No. | Principal dielectric composition | | | Subsidiary component | | | Dielectric constant (20° C.) | tan δ (20° C.) [%] |
|---|---|---|---|---|---|---|---|---|
| | PbZrO$_3$ (mol %) | Pb(Ni$_{1/3}$Nb$_{2/3}$)O$_3$ (mol %) | Pb(Ni$_{1/2}$W$_{1/2}$)O$_3$ (mol %) | PbO (mol %) | NiO (mol %) | WO$_3$ (mol %) | | |
| 6* | 55.0 | 30.0 | 15.0 | 30.0 | 25.0 | 0 | 3900 | 6.3 |
| 7 | 35.0 | 60.0 | 5.0 | 10.0 | 5.0 | 0 | 7830 | 4.0 |
| 8 | 55.0 | 40.0 | 5.0 | 10.0 | 5.0 | 0 | 6210 | 5.2 |
| 9 | 65.0 | 20.0 | 15.0 | 10.0 | 5.0 | 0 | 6400 | 4.9 |
| 10 | 52.5 | 20.0 | 27.5 | 10.0 | 5.0 | 0 | 5130 | 1.8 |
| 11* | 55.0 | 30.0 | 15.0 | 0.5 | 0 | 0.5 | 1330 | 8.4 |
| 12 | 55.0 | 30.0 | 15.0 | 1.0 | 0 | 1.0 | 4430 | 8.0 |
| 13 | 55.0 | 30.0 | 15.0 | 10.0 | 0 | 5.0 | 7170 | 7.7 |
| 14 | 55.0 | 30.0 | 15.0 | 25.0 | 0 | 15.0 | 4380 | 8.5 |
| 15* | 55.0 | 30.0 | 15.0 | 30.0 | 0 | 25.0 | 3100 | 6.8 |
| 16 | 35.0 | 60.0 | 5.0 | 10.0 | 0 | 5.0 | 6740 | 4.2 |
| 17 | 55.0 | 40.0 | 5.0 | 10.0 | 0 | 5.0 | 5890 | 4.9 |
| 18 | 65.0 | 20.0 | 15.0 | 10.0 | 0 | 5.0 | 5500 | 4.9 |
| 19 | 52.5 | 20.0 | 27.5 | 10.0 | 0 | 5.0 | 5410 | 2.2 |

*The asterisked specimens are reference examples.

As shown in Tables 5 to 7, using the material composition of the invention, in spite of the short sintering time at 900° C., and in various atmospheres, densely sintered bodies exhibiting a high dielectric constant were obtained.

Figure 2:
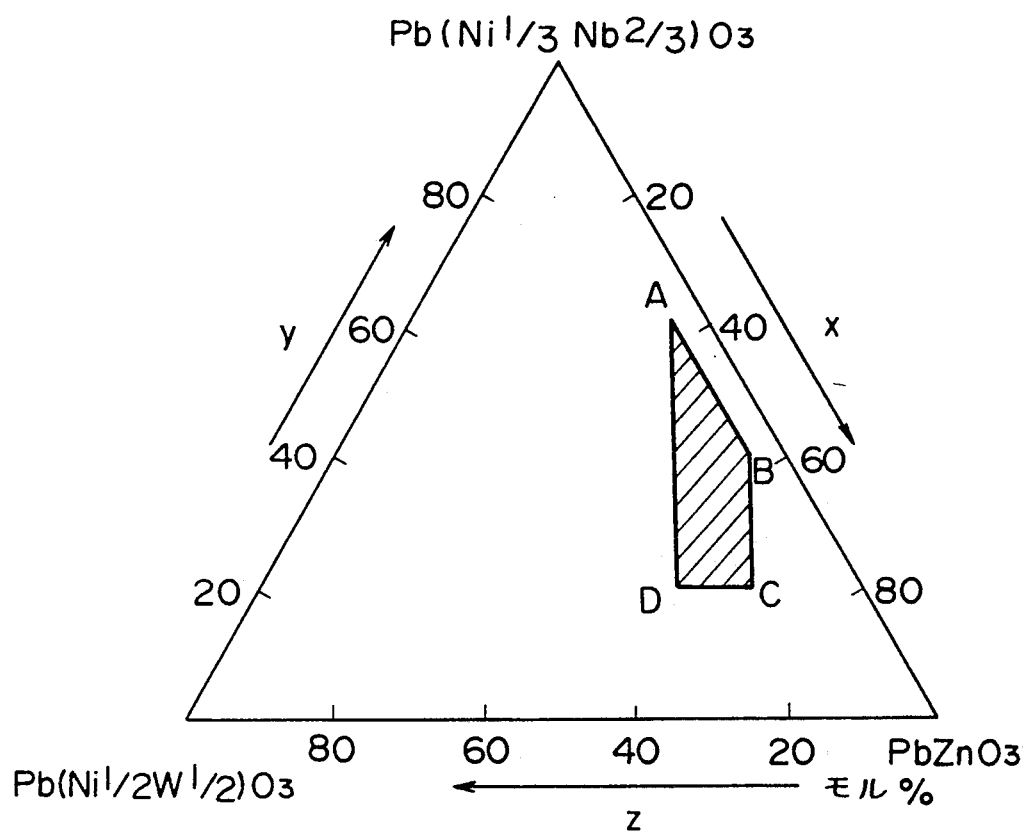
FIG. 2 is a ternary system composition diagram mainly composed of $PbZrO_3$, $Pb(Ni_{\frac{1}{3}} Nb_{\frac{2}{3}})O_3$ and $PB(Ni_{\frac{1}{2}} W_{\frac{1}{2}})O_3$ showing the composition range of the other embodiment of the invention.

In FIG. 2, the composition range of the principal components of the invention is shown in the ternary system composition diagram mainly composed of PbZrO$_3$, Pb(Ni$_{1/3}$Nb$_{2/3}$)O$_3$ and Pb(Ni$_{1/2}$W$_{1/2}$)O$_3$.

Here, the reason of specifically defining the claimed ceramic composition as:

a dielectric ceramic composition comprising main ceramic components represented by the formula PbZr$_x$(Ni$_{1/3}$Nb$_{2/3}$)$_y$(Ni$_{1/2}$W$_{1/2}$)$_z$O$_3$, wherein $x+y+z=1$, and subsidiary components of PbO in an amount of 1.0 to 25.0 mol % and NiO in an amount of 1.0 to 15.0 mol %. The subsidiary components are added to the calcined powder of the main components represented by the formula PbZr$_x$(Ni$_{1/3}$Nb$_{2/3}$)$_y$(Ni$_{1/2}$W$_{1/2}$)$_z$O$_3$. In FIG. 2, the polygon ABCD shows a range of composition of the ceramic composition of the present invention, and the compositions A, B, C, and D at the vertices of the polygon are expressed by the following numerical values:

A is $x = 35.0, y = 60.0, z = 5.0$;
B is $x = 55.0, y = 40.0, z = 5.0$;
C is $x = 65.0, y = 20.0, z = 15.0$;
D is $x = 52.5, y = 20, z = 27.5$. (all units are mol %)

is that the sintering is insufficient and the dielectric constant of the sinters which are sintered at a sintering temperature of 900° C. is less than 5000 in a composition outside the specified range as indicated by reference examples shown in Tables 5 to 7. Furthermore, at sintering temperature of 800° C. or less, the sintering is insufficient, and at 1000° C. or higher, the dielectric constant is lowered, and desired characteristics may not be obtained.

Example 4

Similar to Example 3, to the calcined, crushed and dried dielectric powder, PbO and NiO or WO$_3$ were added as subsidiary components, mixed in a wet process by a ball mill, the mixture was dried, a vehicle having a resin mainly made of ethyl cellulose dissolved in solvent was added, and the compound was kneaded in three-stage rolls, and a dielectric paste was prepared. On the other hand, in order to form a thick film capacity of 2 × 2 mm$^2$ on an alumina substrate of 96% purity, a copper electrode was printed and dried as the lower electrode, the obtained dielectric paste was printed and dried in a thickness of 50 to 60 μm as the dielectric layer in two steps, and a copper electrode similar to the lower electrode was printed and dried as the upper electrode, thereby forming a three-layer printed thick film consisting of an electrode, dielectric and electrode, this was sintered in a nitrogen atmosphere at a maximum temperature of 800° to 1000° C., for 5 to 30 minutes, in a belt furnace. The dielectric constant and tan δ of the thus obtained thick film capacitor were measured in an electric field of 1 kHz, 1 V/mm. The material composition of the invention and the dielectric characteristics of the specimens is sintered at 900° C. in nitrogen are shown in Table 8.

TABLE 8

| No. | Principal dielectric composition | | | Subsidiary component | | | Dielectric constant (20° C.) | tan δ (20° C.) [%] |
|---|---|---|---|---|---|---|---|---|
| | PbZrO$_3$ (mol %) | Pb(Ni$_{1/3}$Nb$_{2/3}$)O$_3$ (mol %) | Pb(Ni$_{1/2}$W$_{1/2}$)O$_3$ (mol %) | PbO (mol %) | NiO (mol %) | WO$_3$ (mol %) | | |
| 1* | 55.0 | 30.0 | 15.0 | 0 | 0 | 0 | 1200 | 12.3 |
| 2* | 55.0 | 30.0 | 15.0 | 0.5 | 0.5 | 0 | 2620 | 10.7 |
| 3 | 55.0 | 30.0 | 15.0 | 1.0 | 1.0 | 0 | 3940 | 7.9 |
| 4 | 55.0 | 30.0 | 15.0 | 10.0 | 5.0 | 0 | 6840 | 5.8 |
| 5 | 55.0 | 30.0 | 15.0 | 25.0 | 15.0 | 0 | 4480 | 5.8 |
| 6* | 55.0 | 30.0 | 15.0 | 30.0 | 25.0 | 0 | 3780 | 6.0 |
| 7 | 35.0 | 60.0 | 5.0 | 10.0 | 5.0 | 0 | 6800 | 4.2 |
| 8 | 55.0 | 40.0 | 5.0 | 10.0 | 5.0 | 0 | 4850 | 5.7 |
| 9 | 65.0 | 20.0 | 15.0 | 10.0 | 5.0 | 0 | 4770 | 5.0 |
| 10 | 52.5 | 20.0 | 27.5 | 10.0 | 5.0 | 0 | 4900 | 2.4 |
| 11* | 55.0 | 30.0 | 15.0 | 0.5 | 0 | 0.5 | 1630 | 8.4 |
| 12 | 55.0 | 30.0 | 15.0 | 1.0 | 0 | 1.0 | 4020 | 5.9 |

TABLE 8-continued

| No. | Principal dielectric composition | | | Subsidiary component | | | Dielectric constant (20° C.) | tan δ (20° C.) [%] |
|---|---|---|---|---|---|---|---|---|
| | PbZrO₃ (mol %) | Pb(Ni⅓Nb⅔)O₃ (mol %) | Pb(Ni½W½)O₃ (mol %) | PbO (mol %) | NiO (mol %) | WO₃ (mol %) | | |
| 13 | 55.0 | 30.0 | 15.0 | 10.0 | 0 | 5.0 | 6000 | 4.8 |
| 14 | 55.0 | 30.0 | 15.0 | 25.0 | 0 | 15.0 | 4750 | 4.9 |
| 15* | 55.0 | 30.0 | 15.0 | 30.0 | 0 | 25.0 | 3230 | 4.5 |
| 16 | 35.0 | 60.0 | 5.0 | 10.0 | 0 | 5.0 | 5940 | 3.5 |
| 17 | 55.0 | 40.0 | 5.0 | 10.0 | 0 | 5.0 | 5590 | 4.7 |
| 18 | 65.0 | 20.0 | 15.0 | 10.0 | 0 | 5.0 | 5020 | 5.7 |
| 19 | 52.5 | 20.0 | 27.5 | 10.0 | 0 | 5.0 | 4550 | 1.8 |

*The asterisked specimens are reference examples.

While specific embodiments of the invention have been illustrated and described herein, it is realized that modifications and changes will occur to those skilled in the art. It is therefore to be understood that the appended claims are intended to cover all modification and changes which fall within the true spirit and scope of the invention.

We claim:

1. A dielectric ceramic composition consisting essentially of a principal component represented by the formula

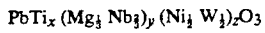

wherein $X+y+z=1$, and substantially components of PbO in an amount of 1.0 to 25.0 mol % and NiO or WO₃ in an amount of 1.0 to 15.0 mol %, wherein said subsidiary components are added to a calcined powder of said principal component, and wherein the values of x, y and z fall within ranges represented by a polygon ABCDE of a ternary system composition diagram of PbTi$_x$(Mg⅓Nb⅔)$_y$(Ni½W½)$_z$O₃, such that the vertices of the polygon corresponding to compositions A, B, C, D, E are represented by the following numerical values:

A is $x = 2.5$, $y = 95.0$, $z = 2.5$;
B is $x = 12.5$, $y = 85.0$, $z = 2.5$;
C is $x = 60.0$, $y = 10.0$, $z = 30.0$;
D is $x = 40.0$, $y = 10.0$, $z = 50.0$;
E is $x = 2.5$, $y = 90.0$, $z = 7.5$ (all units mol %).

2. A dielectric ceramic composition of claim 11, wherein PbO is added in an amount of 1.0 to 25.0 mol % and WO₃ is added in an amount of 1.0 to 15.0 mol % to the calcined powder of said principal component.

3. A ceramic capacitor composed of:
a dielectric ceramic composition consisting essentially of a principal component represented by the formula

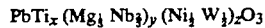

wherein $x+y+z=1$, and subsidiary components of PbO in an amount of 1.0 to 25.0 mol % and NiO or WO₃ in an amount of 1.0 to 15.0 mol %, wherein said subsidiary components are added to a calcined powder of said principal component, and wherein the values of x, y and z fall within ranges represented by a polygon ABCDE of a ternary system composition diagram of PbTi$_x$(Mg⅓Nb⅔)$_y$(Ni½W½)$_z$O₃, such that the vertices of the polygon corresponding to compositions A, B, C, D, E are represented by the following numerical values A is $x = 2.5$, $y = 95.0$, $z = 2.5$;
B is $x = 12.5$, $y = 85.0$, $z = 2.5$;
C is $x = 60.0$, $y = 10.0$, $z = 30.0$;
D is $x = 40.0$, $y = 10.0$, $z = 50.0$;
E is $x = 2.5$, $y = 90.0$, $z = 7.5$ (all units mol %), and electrodes that can be sintered at 800° to 1000° C. in the atmosphere.

4. A ceramic capacitor composed of:
a dielectric ceramic composition consisting essentially of a principal component represented by the formula

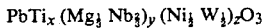

wherein $x+y+z=1$, and subsidiary components of PbO in an amount of 1.0 to 25.0 mol % and NiO or WO₃ in an amount of 1.0 to 15.0 mol %, wherein said subsidiary components are added to a calcined powder of said principal component, and wherein the values of x, y and z fall within ranges represented by a polygon ABCDE of a ternary system composition diagram of PbTi$_x$(Mg⅓Nb⅔)$_y$(Ni½W½)$_z$O₃, such that the vertices of the polygon corresponding to compositions A, B, C, D, E are represented by the following numerical values A is $x = 2.5$, $y = 95.0$, $z = 2.5$;
B is $x = 12.5$, $y = 85.0$, $z = 2.5$;
C is $x = 60.0$, $y = 10.0$, $z = 30.0$;
D is $x = 40.0$, $y = 10.0$, $z = 50.0$;
E is $x = 2.5$, $y = 90.0$, $z = 7.5$ (all units mol %), and electrodes that can be sintered at 800° to 1000° C. in a neutral atmosphere or a reducing atmosphere.

5. A thick film capacitor composed by disposing a dielectric layer made of a dielectric ceramic composition and electrodes that can be sintered at 800° to 1000° C. on a ceramic substrate,
said dielectric ceramic composition consisting essentially of a principal component represented by the formula

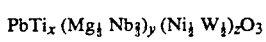

wherein $x+y+z=1$, and subsidiary components of PbO in an amount of 1.0 to 25.0 mol % and NiO or WO₃ in an amount of 1.0 to 15.0 mol %, wherein said subsidiary components are added to a calcined powder of said principal component, and wherein the values of x, y and z fall within ranges represented by a polygon ABCDE of a ternary system composition diagram of PbTi$_x$(Mg$_{\frac{1}{3}}$Nb$_{\frac{2}{3}}$)$_y$(Ni$_{\frac{1}{2}}$W$_{\frac{1}{2}}$)$_z$O$_3$, such that the vertices of the polygon corresponding to compositions A, B, C, D, E are represented by the following numerical values A is $x = 2.5$, $y = 95.0$, $z = 2.5$;
B is $x = 12.5$, $y = 85.0$, $z = 2.5$;
C is $x = 60.0$, $y = 10.0$, $z = 30.0$;
D is $x = 40.0$, $y = 10.0$, $z = 50.0$;
E is $x = 2.5$, $y = 90.0$, $z = 7.5$ (all units mol %).

* * * * *